United States Patent
Rosseau et al.

(10) Patent No.: US 7,163,169 B1
(45) Date of Patent: Jan. 16, 2007

(54) FISHING LINE FREE SPOOLING REGULATION SYSTEM

(75) Inventors: James R. Rosseau, Birmingham, MI (US); Robert H. Rosseau, Inverness, IL (US)

(73) Assignee: ETC III LLC, Morton grove, IL (US)

( * ) Notice: Subject to any disclaimer, the term of this patent is extended or adjusted under 35 U.S.C. 154(b) by 0 days.

(21) Appl. No.: 10/932,626

(22) Filed: Sep. 2, 2004

(51) Int. Cl.
*A01K 69/00* (2006.01)
(52) U.S. Cl. .......................... 242/309; 43/4.5; 43/19.2; 43/24; 43/25
(58) Field of Classification Search ............... 242/309, 242/323; 43/17, 4.5, 79.2, 24, 25, 18.1; D22/143
See application file for complete search history.

(56) References Cited

U.S. PATENT DOCUMENTS

| | | | | |
|---|---|---|---|---|
| 2,349,077 A | * | 5/1944 | Comparelli | 43/17 |
| 3,309,810 A | * | 3/1967 | Hannon | 43/24 |
| 3,581,428 A | * | 6/1971 | Helder | 43/25 |
| 3,789,534 A | * | 2/1974 | Yankaitis | 43/19.2 |
| 4,541,195 A | * | 9/1985 | Delaney | 43/17 |
| 4,893,429 A | * | 1/1990 | Yamoto | 43/24 |
| 4,996,789 A | * | 3/1991 | Hoover | 43/24 |
| 5,129,174 A | * | 7/1992 | Wilson | 43/17 |
| 6,282,830 B1 | | 9/2001 | Henry | |
| 2003/0213862 A1 | * | 11/2003 | Perrin | 242/322 |

* cited by examiner

*Primary Examiner*—Kathy Matecki
*Assistant Examiner*—Evan Langdon
(74) *Attorney, Agent, or Firm*—Gardner Carton & Douglas LLP

(57) ABSTRACT

Disclosed is a system for regulating fishing line tension. The system comprises a plurality of line retainers. Each line retainer comprises a holder on which the line rests, an elongated portion, and a clip that is attached to the surface of a fishing rod proximate the handle. The line retainer may be fabricated as one seamless piece of resilient material or may comprise at least two pieces of different material. The method for regulating the free spooling of a fishing line enables a fishing enthusiast to regulate tension on the fishing line with an open bail or in the free spool position on the drag system.

20 Claims, 4 Drawing Sheets

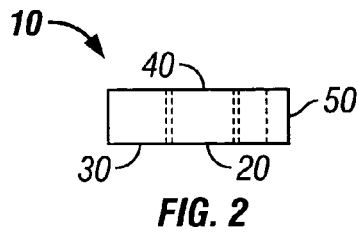
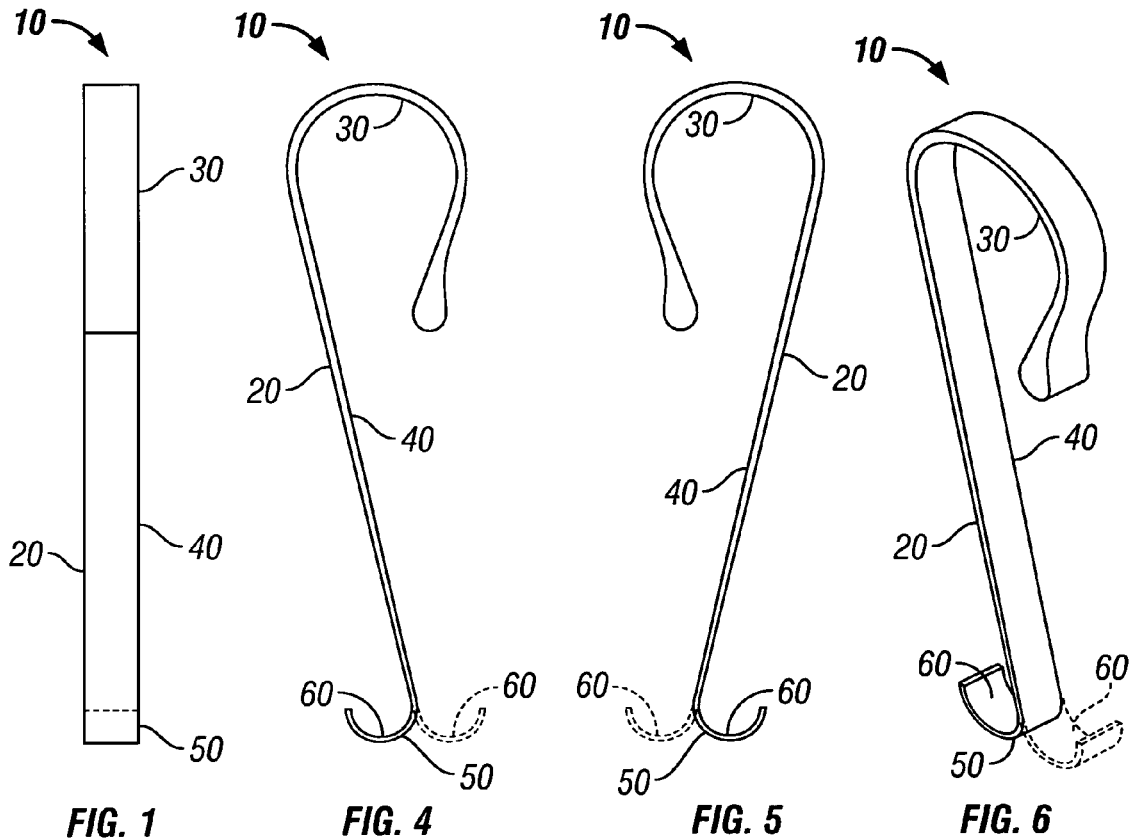
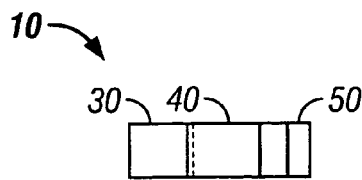

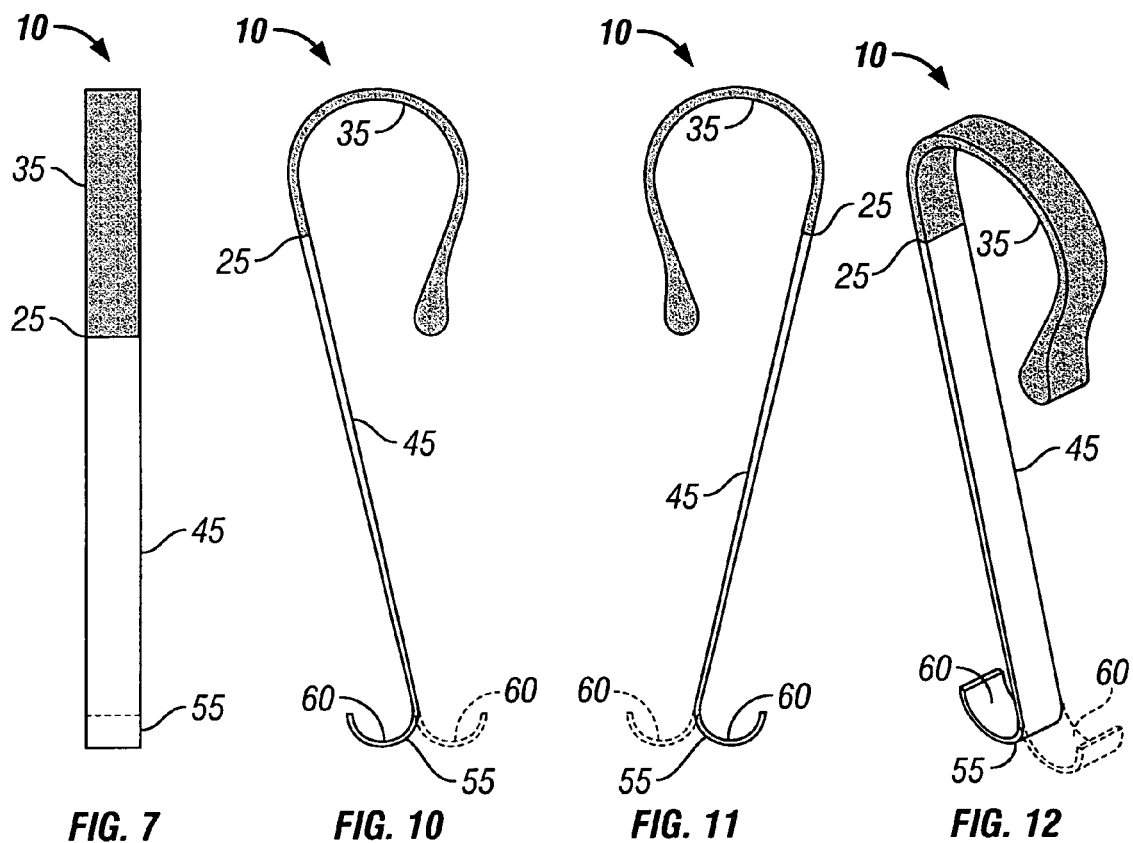

FISHING LINE FREE SPOOLING REGULATION SYSTEM

FIELD OF THE INVENTION

This invention pertains to the field of fishing rods and reels and more particularly to a system for regulating tension on a fishing line.

BACKGROUND OF THE INVENTION

Many devices exist that are related to fishing and are designed to improve the fishing enthusiast's success in catching fish. These devices relate to various aspects of fishing reels, rods and hooks. A fishing enthusiast may encounter difficulty when trying to regulate tension on the fishing line prior to reeling in the line. In addition, the fisherman may not be able to secure the correct amount of tension based on the size and type of fishing rod he is using or the environmental conditions under which he is fishing. When the fishing reel is in free spool, the line extends freely without any restraint. In this situation, there is no tension on the line to prevent free spooling until a fish strikes the lure attached to the end of the fishing line. Once the fish strikes the lure, it is necessary to have no tension on the line and to allow free spooling to occur.

U.S. Pat. No. 6,282,830 to Henry discloses a device and method wherein the device is intended to be clipped onto a fishing rod and to impart action to the line emanating from an open-face spinning reel while reeling in the line. The Henry device imparts action on the lure while retrieving the line.

This prior art device and method, however, have various drawbacks. The Henry device teaches a line rest portion which is an integral, static unit made of rigid material. Further, Henry teaches a method for imparting action to a fishing line upon retrieval of the line. It is not designed to prevent free spooling. Thus, it is for a totally different use. The present invention addresses the deficiencies of this prior art design in that it provides a fishing line free spooling regulation system that is made of resilient material and is passive when reeling in the line. The present invention may be used with a variety of different types of fishing reels.

BRIEF SUMMARY OF THE INVENTION

The present invention provides a system for regulating free line spooling when fishing, specifically for use during trolling. The system comprises a plurality of flexible line retainers that attach to a fishing rod's surface. Selection of a particular line retainer depends on the amount of tension encountered, which may be influenced by the environmental conditions present, such as wind and wave action. Each line retainer in the system has a different level of tension. The line retainer comprises a generally elongated portion terminating in a clip at one end and a holder with a curved end at the other end. The clip attaches to the surface of the fishing rod, and the holder retains the fishing line emanating from the reel. The fishing rod used can be a traditional rod or a fly rod. The line retainer can be used in conjunction with a spinning reel, conventional reel, or fly reel. The holder assists in regulating line tension while free spooling with an open bail or in a free spool position on the drag system. The device is not intended for use upon retrieval of the fishing line, i.e., when reeling in the line. When the fish strikes the line, or the line retainer used has an incorrect tension level, the line drops off the holder and starts to free spool. The user must then start to retrieve the line in order to catch the fish. Once the line is released, the resilient material automatically returns to its original curved configuration. At this point, the device is not in use and is passive until the next use.

In one embodiment, the device of the present invention comprises a seamless piece of pliable material, which holds the fishing line at one end and attaches to the fishing rod at the other end. The line retainer is attached to the fishing rod, and the line is disposed on the holder. One possible material from which the line retainer can be made is "spring" or "memory" steel. Alternatively, this resilient material may be plastic. In this embodiment, the line retainer has finished rolled edges. Prior to the application of a predetermined amount of tension, the line is held by the holder. Thus, when the bail of the fishing reel is open or in the free spool position on the drag system, free spooling cannot occur. When greater than a predetermined amount of tension is applied to the line, the curved end of the holder straightens, releasing the fishing line to allow free spooling to occur. The threshold amount of tension depends on the resiliency of the line retainer chosen from the system. Once the line is released, the resilient material automatically returns to its original curved configuration and is passive until the next use.

In another embodiment, the device of the present invention comprises two pieces, each made of a different material. In this embodiment, the clip is a separate piece made of nylon or plastic, and the holder and elongated portion are made of a resilient material. This resilient material may be "spring" or "memory" steel. Alternatively, this resilient material may be plastic. The function of this embodiment is the same as when the line retainer is made of a single piece of pliable material. A line retainer comprising two pieces and made of two different types of material may facilitate easier manufacturing.

An advantage of the present invention is that it provides a method for regulating free spooling of a fishing line with a flexible line retainer system. In this method the line retainer is attached to the surface of the fishing rod proximate the handle in front of the reel. The fishing line emanating from the reel is then placed on the curved end of the holder. When greater than a predetermined amount of tension is applied to the line, the curved end of the holder straightens, and the fishing line is released. Once the line is released, the resilient material automatically returns to its original curved configuration and is passive until the next use.

Finally, another advantage of the present invention is that it provides a fishing system that includes a fishing rod, reel, line and free spooling regulation means. The regulation means prevents free spooling when the bail of the fishing reel is open or in the free spool position on the drag system and allows free spooling when greater than a predetermined amount of pressure is applied to the line.

These and other advantages of the invention will be apparent from the description of the invention provided herein.

BRIEF DESCRIPTION OF THE DRAWINGS

The foregoing objects, features and advantages of the present invention will be readily understood when described below and illustrated in the accompanying drawings, in which:

FIG. 1 illustrates a side planar view of one embodiment of the device of the present invention wherein the line retainer is made of a single piece of pliable material.

FIG. 2 illustrates a top view along the elongated portion of the device of FIG. 1.

FIG. 3 is a bottom view along the elongated portion of the device of FIG. 1.

FIG. 4 is a front planar view of the device of FIG. 1.

FIG. 5 illustrates a back planar view of the device of FIG. 1.

FIG. 6 illustrates a perspective view of the device of FIG. 1.

FIG. 7 illustrates a side planar view of another embodiment of the device of the present invention wherein the line retainer comprises two pieces—a clip made of nylon or plastic and a holder made of a pliable, resilient material.

FIG. 8 illustrates a top view along the elongated portion of the device of FIG. 7.

FIG. 9 is a bottom view along the elongated portion of the device of FIG. 7.

FIG. 10 is a front planar view of the device of FIG. 7.

FIG. 11 illustrates a back planar view of the device of FIG. 7.

FIG. 12 illustrates a perspective view of the device of FIG. 7.

DETAILED DESCRIPTION OF THE INVENTION

Figure 13:
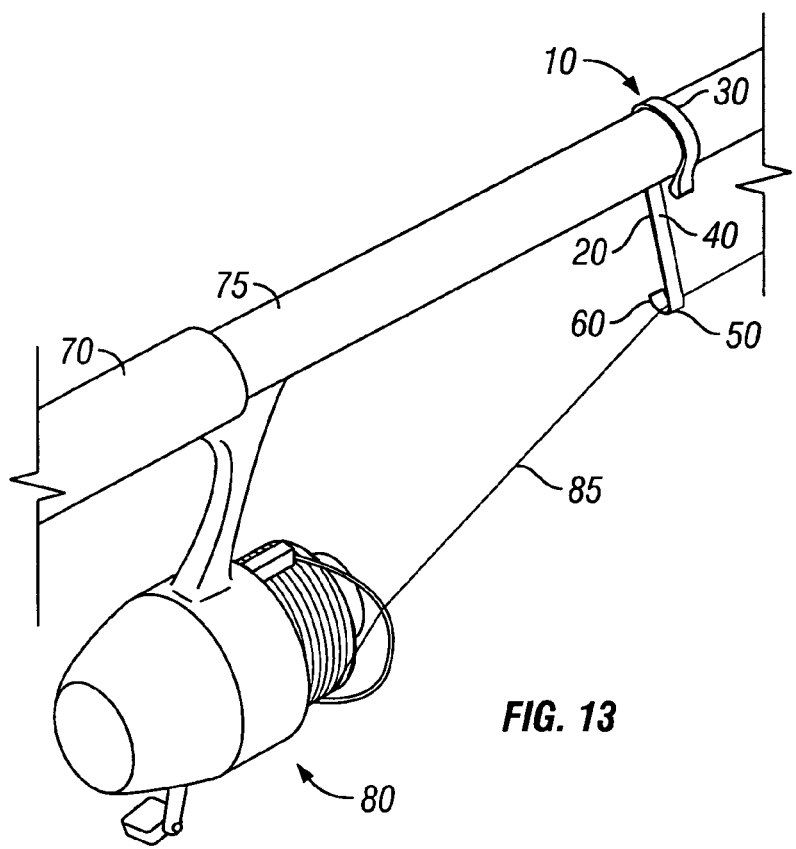
FIG. 13 illustrates one embodiment of the system of the present invention disposed on the surface of a fishing rod, with the line emanating from the reel held by the curved end of the holder. The line retainer depicted is made of a single piece of pliable material.

Turning first to FIG. 1, there is illustrated the flexible line retainer 10 of the present invention according to one embodiment. The device comprises a clip 30, an elongated portion 40 and a holder 50. The clip 30 attaches the line retainer 10 to the surface 75 of the fishing rod 70 proximate the handle, and the holder 50 retains the fishing line 85, as further depicted in FIG. 13. The line retainer 10 is a seamless piece of pliable material 20. Further, the line retainer 10 may be made of a resilient material such as "spring" or "memory" steel. Alternatively, the line retainer 10 may be made out of plastic. FIGS. 2 through 5 illustrate top, bottom, front planar and back planar views of the line retainer 10 illustrated in FIG. 1. Turning to FIG. 6, there is illustrated a perspective view of the flexible line retainer 10 of FIG. 1.

Another alternative embodiment of the invention is illustrated in FIG. 7, in which the line retainer 10 comprises two separate parts 25—a clip 35 and a holder 55 with elongated portion 45. In this embodiment, the clip 35 is made of nylon or plastic material and the holder 55 and elongated portion 45 are made of a resilient material. One possible material for the holder 55 and the elongated portion 45 in this configuration is "spring" or "memory" steel. Alternatively, the holder 55 and elongated portion 45 could be made of a resilient plastic. As in FIGS. 7 and 15, the clip 35 attaches the line retainer 10 to the surface 75 of the fishing rod 70 on one end, and the holder 55 retains the fishing line 85 on the other end. FIGS. 8 through 11 illustrate top, bottom, front planar and back planar views of the line retainer 10 illustrated in FIG. 7. Turning to FIG. 12, there is illustrated a perspective view of the line retainer 10 of FIG. 7.

FIG. 13 illustrates the free spooling regulation system of the present invention. In this illustration, the line retainer 10 is disposed on the surface 75 of a fishing rod 70 proximate the handle. The tension of the fishing line 85 emanating from the reel 80 attached to the rod 70 in the current illustration is regulated by the holder 50 component of the line retainer 10. In this configuration the line retainer 10 restricts any free spooling.

Figure 14:
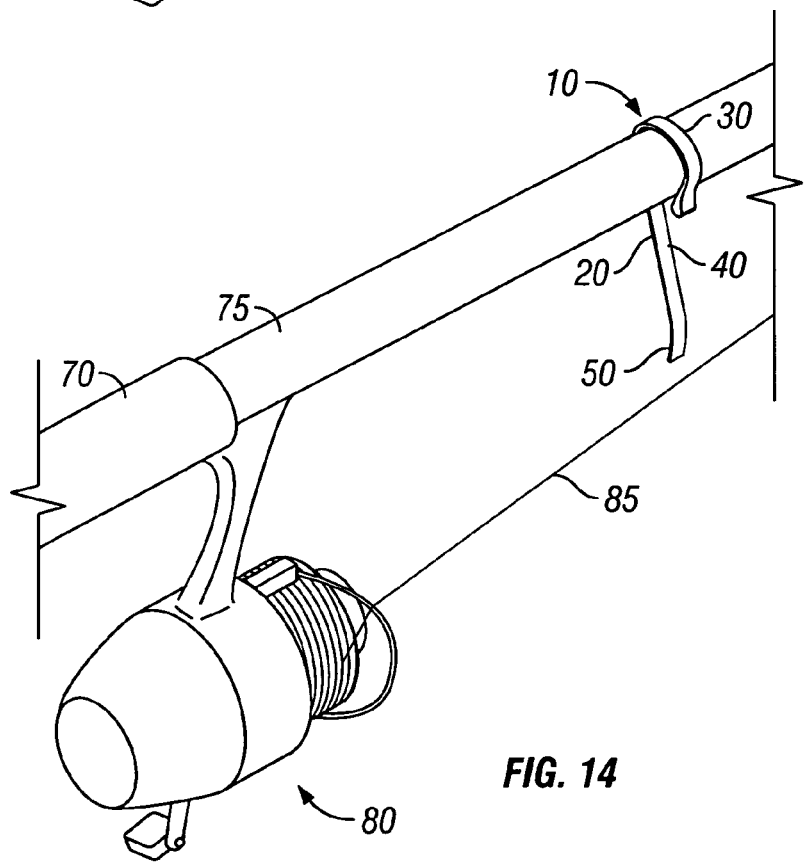
FIG. 14 illustrates the system of FIG. 13, wherein tension has been applied to the line, straightening the curved holder of the line retainer and allowing for release of the line and free spooling to occur. The line retainer depicted is made of a single piece of pliable material. Once the line is released, the resilient material returns to its original curved configuration and remains passive until the system's next use.

Turning to FIG. 14, there is illustrated the system of FIG. 13 in the instance when more than a predetermined amount of tension has been applied to the fishing line 85. The threshold amount of tension is determined by the size of the fishing rod 70 proximate the handle and the environmental conditions present, such as wind and wave action. Individual line retainers 10 in the system may be chosen based on the threshold amount of tension sought. When the aforementioned amount of tension has been applied to the line 85, the curved end 60 of the holder 50, on which the line 85 rests, straightens, thus releasing the line 85 and allowing free spooling to occur. Once the line is released, the resilient material automatically returns to its original curved configuration and is passive until the next use.

Figure 15:
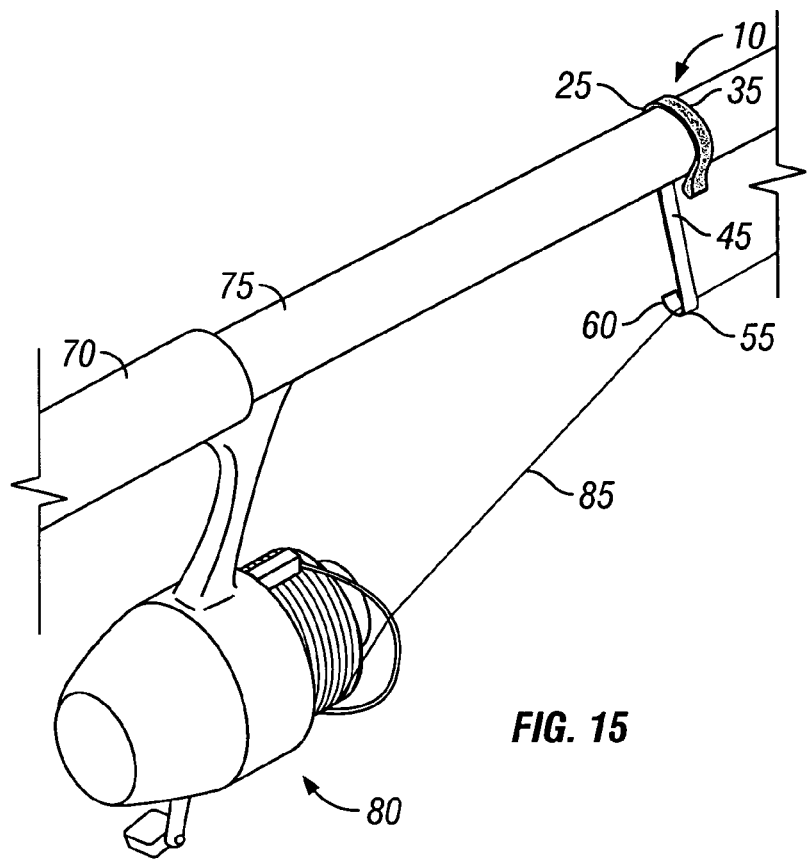
FIG. 15 illustrates one embodiment of the device of the present invention disposed on the surface of a fishing rod, with the line emanating from the reel held by the curved holder at the end of the device. The line retainer depicted has two pieces—a clip made of nylon or plastic and a holder made from a pliable, resilient material.

Turning now to FIG. 15, there is illustrated the system of the present invention wherein the line retainer 10 is disposed on the surface 75 of the fishing rod 70 with the line 85 emanating from the reel 80 retained by the curved end 60 of the holder 55. This illustration shows the line retainer 10 in its alternative embodiment comprising two pieces 25. In this embodiment, the clip 35 component of the line retainer 10 is made of nylon and the line holder 55 and elongated portion 45 are made of a pliable, resilient material. One possible material for the line holder 55 and elongated portion 45 in this embodiment is "spring" or "memory" steel. Alternatively, they could be made of a resilient plastic. As in FIG. 14, the clip 35 attaches the line retainer 10 to the surface 75 of the fishing rod 70 and the holder 55 retains the fishing line 85 emanating from the reel 80.

Figure 16:
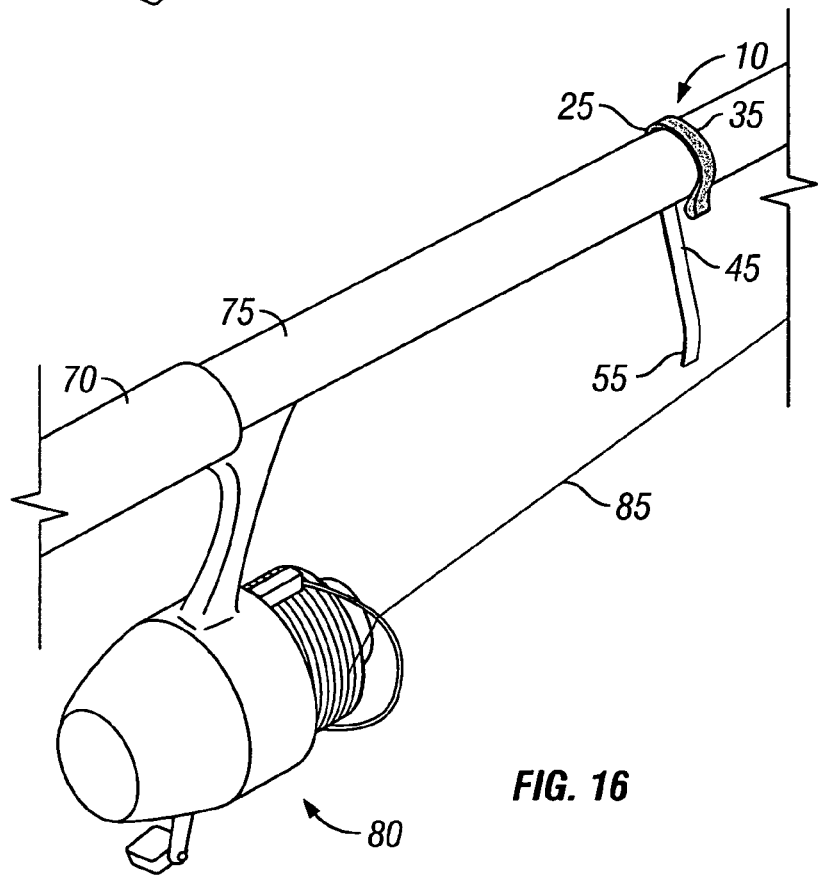
FIG. 16 illustrates the system of FIG. 15, wherein tension has been applied to the line, straightening the curved end of the holder and allowing for release of the line and free spooling to occur. The line retainer depicted comprises two pieces—a clip and elongated portion made of nylon or plastic and a holder made from a pliable, resilient material. Once the line is released, the resilient material automatically returns to its original curved configuration and is passive until the system's next use.

Finally, in FIG. 16, there is illustrated the system of FIG. 15 in the instance when more than a predetermined amount of tension has been applied to the fishing line 85. The threshold amount of tension is determined by the size of the fishing rod 70 and the environmental conditions present, such as wind and wave action. Individual line retainers 10 in the system may be chosen based on the threshold amount of tension sought. When the aforementioned amount of tension has been applied to the line 85, the curved end 60 of the holder 55, on which the line 85 rests, straightens, thus releasing the line 85 from the line retainer 10 and allowing free spooling to occur. Once the line 85 has been released, the straightened end of the holder 55 automatically returns to its original curved configuration and is passive until the next use.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only and should not be taken as limiting the scope of the invention.

What is claimed is:

1. A fishing line free spooling regulation system comprising a plurality of substantially S-shaped flexible line retainers, each of which is adapted to be disposed on the surface of a fishing rod, each line retainer comprising:
    a generally elongated portion that terminates in a clip on one end and a holder at the other end,
    the clip is adapted to be coupled to the fishing rod proximate the handle,
    the holder assumes a first position where the end is formed in a predetermined curve that retains the fishing line and is of sufficient flexibility that, in response to tension from the fishing line, the holder changes its position where the predetermined curve is substantially straightened, resulting in release of the fishing line from the holder.

2. The system of claim 1, wherein each line retainer is made of a seamless length of pliable material.

3. The system of claim 1, wherein the line retainers are fabricated from a resilient material.

4. The system of claim 1, wherein at least two of the plurality of flexible line retainers have different resiliency.

5. The system of claim 1, wherein the line retainers have finished rolled edges.

6. The system of claim 1, wherein the holder automatically returns to the predetermined curved position once the fishing line is released.

7. A single substantially S-shaped flexible fishing line retainer adapted to be disposed on the surface of a fishing rod comprising:
    a generally elongated portion that terminates in a clip on one end and a holder at the other end,
    the clip is adapted to be coupled to the fishing rod proximate the handle,
    the holder assumes a first position where the end is formed in a predetermined curve that retains the fishing line and is of sufficient flexibility that, in response to tension from the fishing line, the holder changes its position where the predetermined curve is substantially straightened, resulting in release of the fishing line from the holder.

8. The line retainer of claim 7, wherein the line retainer is made of a seamless length of pliable material.

9. The line retainer of claim 7, wherein the line retainer is fabricated from a resilient material.

10. The line retainer of claim 7, wherein the line retainer has finished rolled edges.

11. The line retainer of claim 7, wherein the holder automatically returns to the predetermined curved position once the fishing line is released.

12. A substantially S-shaped flexible fishing line retainer adapted to be disposed on the surface of a fishing rod comprising:
    a generally elongated portion, comprising at least two pieces, that terminates in a clip on one end and a holder at the other end,
    the clip is adapted to be coupled to the fishing rod proximate the handle,
    the holder assumes a first position where the end is formed in a predetermined curve that retains the fishing line and is of sufficient flexibility that, in response to tension from the fishing line, the holder changes its position where the predetermined curve is reduced, resulting in release of the fishing line from the holder.

13. The line retainer of claim 12, wherein the components comprise at least two pieces, each fabricated from a different material.

14. The line retainer of claim 12, wherein the clip is made of nylon or plastic material.

15. The line retainer of claim 12, wherein the elongated portion and holder are made of pliable material.

16. The line retainer of claim 12, wherein the elongated portion and holder are fabricated from a resilient material.

17. The line retainer of claim 12, wherein the line retainer has finished rolled edges.

18. The line retainer of claim 12, wherein the holder automatically returns to the predetermined curved position once the fishing line is released.

19. A method for regulating the free spooling of a fishing line with a flexible line retainer system, each line retainer comprising a substantially S-shaped generally elongated portion that terminates in a clip on one end and a holder at the other end, the clip couples with the fishing rod proximate the handle, and the holder having a curved end on which the fishing line is retained, said method comprising the steps of:
    attaching the flexible line retainer to the surface of the fishing rod proximate the handle,
    disposing the fishing line on the holder, thus preventing free spooling of the fishing line while the bail of the fishing reel is open or in the free spool position on the drag system,
    allowing for release of the line from the flexible line retainer by the substantial straightening of the curved end of the holder when greater than a predetermined amount of tension is applied to the line,
    automatically returning the holder to its original curved configuration once the fishing line is released and remaining passive until the line retainer's next use.

20. The method of claim 19, wherein the amount of tension varies depending on resiliency characteristics of the line retainer.

* * * * *